US012482598B2

(12) United States Patent
Xie

(10) Patent No.: US 12,482,598 B2
(45) Date of Patent: Nov. 25, 2025

(54) INDUCTOR, INDUCTOR FABRICATION METHOD, AND POWER SUPPLY CIRCUIT CONTAINING INDUCTOR

(71) Applicant: Joulwatt Technology Co., Ltd., Hangzhou (CN)

(72) Inventor: Jianyu Xie, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 586 days.

(21) Appl. No.: 17/983,272

(22) Filed: Nov. 8, 2022

(65) Prior Publication Data

US 2023/0142850 A1 May 11, 2023

(30) Foreign Application Priority Data

Nov. 8, 2021 (CN) ........................ 202111312334.9

(51) Int. Cl.
*H01F 27/36* (2006.01)
*H01F 27/02* (2006.01)
*H01F 41/00* (2006.01)

(52) U.S. Cl.
CPC ........... *H01F 27/36* (2013.01); *H01F 27/022* (2013.01); *H01F 41/005* (2013.01)

(58) Field of Classification Search
CPC ...... H01F 27/36; H01F 27/022; H01F 41/005; H01F 27/02; H01F 27/29; H01F 27/363; H01F 37/00; H01F 27/361; H01F 27/366; H01F 27/292
See application file for complete search history.

(56) References Cited

U.S. PATENT DOCUMENTS

| | | | | |
|---|---|---|---|---|
| 8,063,727 | B2 * | 11/2011 | Emmons | H01F 27/363 336/84 C |
| 11,657,957 | B2 * | 5/2023 | Takatsuji | H01F 27/292 336/84 R |
| 2007/0001782 | A1 * | 1/2007 | Sasaki | H03H 1/0007 333/185 |
| 2013/0187480 | A1 * | 7/2013 | Hiei | H05K 1/0298 307/112 |
| 2017/0309394 | A1 * | 10/2017 | Blow | H01F 27/366 |
| 2018/0005747 | A1 * | 1/2018 | Shijo | H01F 27/28 |
| 2018/0166980 | A1 * | 6/2018 | Ito | H02M 3/06 |

(Continued)

*Primary Examiner* — Mang Tin Bik Lian
(74) *Attorney, Agent, or Firm* — Bayramoglu Law Offices

(57) ABSTRACT

An inductor includes an encapsulation shell with an inductive component encapsulated inside; an input electrode exposed on a surface of the encapsulation shell and configured to receive an alternating voltage; an output electrode exposed on the surface of the encapsulation shell and configured to output a direct current voltage, where the input electrode and the output electrode are electrically isolated by the encapsulation shell; and a metal shield layer asymmetrically covering the surface of the encapsulation shell and electrically connected to the output electrode, where the metal shield layer keeps the input electrode electrically isolated from the output electrode. An inductor fabrication method and a power supply circuit containing an inductor are further provided to resolve prior-art problems such as small range and poor effect of electromagnetic shielding and potential instability of the inductor, thereby achieving a better electromagnetic shielding effect and keeping the potential of the inductor stable.

20 Claims, 4 Drawing Sheets

(56) References Cited

U.S. PATENT DOCUMENTS

| | | | | |
|---|---|---|---|---|
| 2020/0090850 | A1 * | 3/2020 | Isobe | H01F 27/292 |
| 2020/0143979 | A1 * | 5/2020 | Ohkubo | H01F 27/36 |
| 2021/0296046 | A1 * | 9/2021 | Ikenaga | H01F 41/0246 |
| 2023/0075338 | A1 * | 3/2023 | Higashida | H01F 17/045 |

* cited by examiner

INDUCTOR, INDUCTOR FABRICATION METHOD, AND POWER SUPPLY CIRCUIT CONTAINING INDUCTOR

CROSS REFERENCE TO THE RELATED APPLICATIONS

This application is based upon and claims priority to Chinese Patent Application No. 202111312334.9, filed on Nov. 8, 2021, the entire contents of which are incorporated herein by reference.

TECHNICAL FIELD

The present disclosure relates to the technical field of semiconductors, and specifically, to an inductor, an inductor fabrication method, and a power supply circuit containing the inductor.

BACKGROUND

The inductor is one of the components commonly used in power supply circuits, which can convert electrical energy into magnetic energy and store it. In some circuits which use 220V alternating current as the power source, some part circuits that are sensitive to electromagnetic interference (EMI) require inductor to be connected to both the power source input terminals for filtering to reduce EMI and ripple noises. However, the inductor, serving as a power device, generates a magnetic field during operation which is easily radiated to the outside, affecting the normal operation of other circuits and components. Therefore, it is necessary to magnetically shield the inductor.

Commercially available inductors are usually magnetically shielded by wrapping one or more layers of copper foil around two sides of the inductors and fixing the copper foil through tin soldering.

However, the above technology has at least the following defects: The copper foil covers the two symmetrical terminals only, and other positions are not covered, causing defects such as a small shielding range and poor shielding effect. Due to the small coverage, the inductor radiates a large magnetic field to the outside and produces radiation to the external environment.

SUMMARY

Given this, the purpose of this application is to propose an inductor, an inductor fabrication method, and a power supply circuit containing the inductor to resolve prior-art problems such as small range and poor effect of electromagnetic shielding and potential instability of the inductor, thereby achieving a better electromagnetic shielding effect and keeping the potential of the inductor stable.

This application provides an inductor including an encapsulation shell with an inductive component encapsulated inside; an input electrode exposed on a surface of the encapsulation shell and configured to receive an alternating voltage; an output electrode exposed on the surface of the encapsulation shell and configured to output a direct current voltage, where the input electrode and the output electrode are electrically isolated by the encapsulation shell; and a metal shield layer asymmetrically covering the surface of the encapsulation shell and electrically connected to the output electrode, where the metal shield layer keeps the input electrode electrically isolated from the output electrode.

Further, the metal shield layer covers at least one surface of the encapsulation shell.

Further, the input electrode is exposed on the bottom surface of the encapsulation shell, the output electrode is exposed on the same bottom surface of the encapsulation shell as the input electrode, and the metal shield layer covers at least part or all of the top surface of the encapsulation shell opposite to the bottom surface.

Further, the encapsulation shell is a flat cuboid, and the bottom surface and the top surface each have an area larger than the other sides of the cuboid.

Further, the metal shield layer extends from the top surface of the flat cuboid to the bottom surface along a side adjacent to the output electrode until contacting the output electrode.

Further, the metal shield layer covers areas including the top surface of the flat cuboid, a part of the bottom surface on which the output electrode is located, and the side adjacent to, but not in contact with, the output electrode. The three areas make the metal shield layer connected as a whole.

Further, the metal shield layer extends from the top surface of the flat cuboid to the bottom surface along multiple sides, avoids the input electrode, and contacts the output electrode.

Further, the metal shield layer covers areas including the top surface of the flat cuboid, a part of the bottom surface on which the output electrode is located, a side adjacent to, but not in contact with, the output electrode, and a part or all of the two sides in contact with the output electrode. A part of the metal shield layer covering the two sides in contact with the output electrode avoids the input electrode, such that the output electrode and the input electrode are electrically isolated.

As a purpose of this application, an inductor fabrication method is further provided including the following steps:

- encapsulating an inductive component to form an encapsulation shell and exposing an input electrode and an output electrode on the bottom surface of the encapsulation shell;
- electroplating a metal layer on the encapsulation shell; and
- patterning the electroplated metal layer to form a metal shield layer, where
- the metal shield layer asymmetrically covers the surface of the encapsulation shell after patterning and covers at least a top surface of the encapsulation shell opposite to the bottom surface, and the metal shield layer keeps the input electrode electrically isolated from the output electrode.

Further, the metal shield layer is in electrical contact with the output electrode, such that the potential of the metal shield layer is the same as the potential of the output electrode.

As another purpose of this application, a power supply circuit is further provided, including a power circuit configured to provide an alternating voltage; the inductor described above, where an input electrode of the inductor receives the alternating voltage output by the power circuit; and a circuit constituting a loop of the power circuit and the inductor.

Compared with the prior art, the benefits of this application include: The metal shield layer provided on the encapsulation shell significantly increases the shielding area of the inductor, such that the inductor has a better electromagnetic shielding effect, not only preventing external EMI but also minimizing the EMI caused by the inductor to the outside while maintaining a stable potential. In addition, the inductor fabrication process of this application is simple and reliable.

BRIEF DESCRIPTION OF THE DRAWINGS

The accompanying drawings described here are provided for further understanding of the present disclosure and constitute a part of this application. The exemplary examples and illustrations thereof of the present disclosure are intended to explain the present disclosure without forming inappropriate limitations to the present disclosure. In the accompanying drawings.

DETAILED DESCRIPTION OF THE EMBODIMENTS

Figure 1:
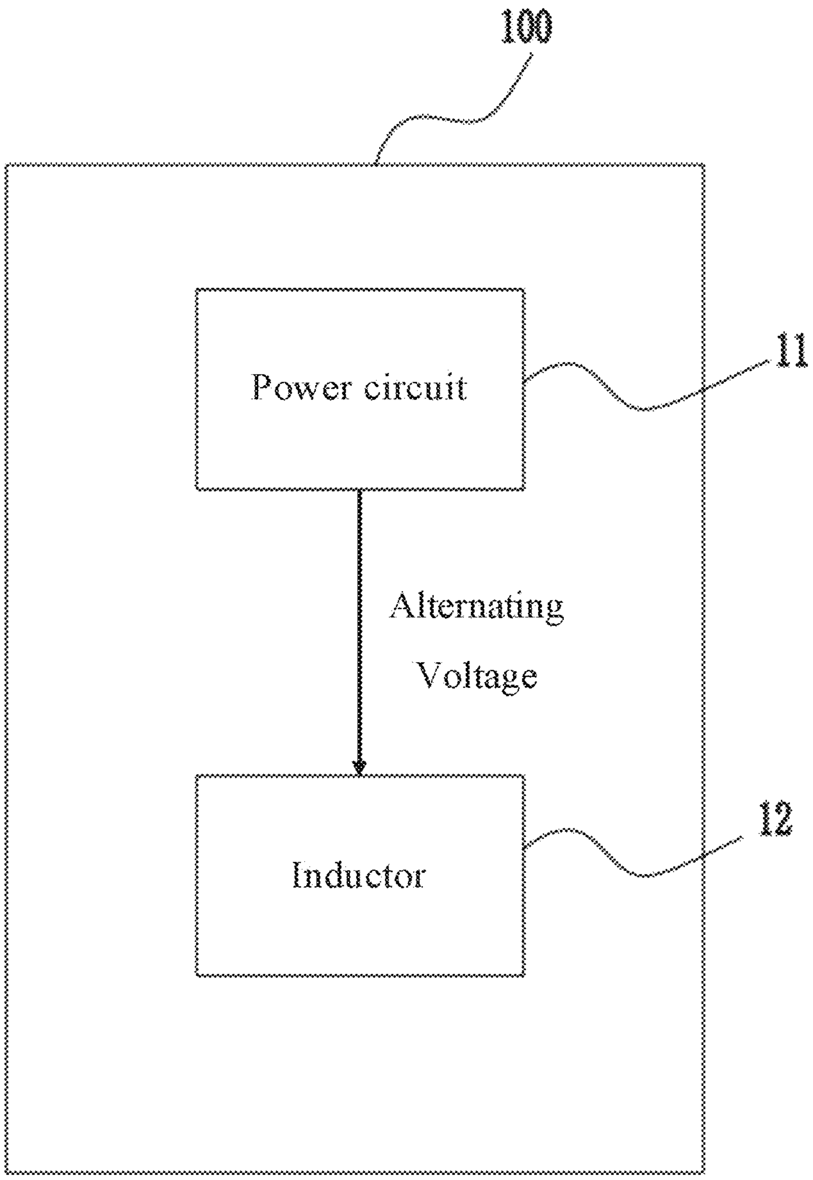
FIG. 1 is a schematic diagram of a power supply circuit according to this application.

The embodiments of this application provide an inductor, an inductor fabrication method, and a power supply circuit containing an inductor to resolve prior-art problems such as small range and poor effect of electromagnetic shielding and potential instability of the inductor, thereby achieving a better electromagnetic shielding effect and keeping the potential of the inductor stable.

The technical solution in the embodiments of this application is intended to resolve the above-mentioned problems in the prior art, and the general idea is as follows:

Metal shield layer 125 is provided on the surface of encapsulation shell 121 to ensure that at least part of output electrode 123 of inductor 12 is covered by the metal shield layer 125 while the input electrode 122 is electrically isolated from the output electrode 123, that is, a current received by the input electrode 122 is not directly transmitted to the output electrode 123. In addition, the encapsulation material between the input electrode 122 and the output electrode 123 is also provided with an area mostly covered by the metal shield layer 125, and a device (such as a magnetic core) disposed between the input electrode 122 and the output electrode 123 may also be wrapped by the metal shield layer 125 to prevent other components in the power supply circuit from causing EMI to the magnetic core, such that the inductor 12 can maintain a stable potential.

The present disclosure is described in detail below with reference to various implementations shown in the accompanying drawings, but these implementations are not intended to limit this application, and functions, methods, or structural equivalent transformations or replacements made by those of ordinary skill in the art according to these implementations fall within the protection scope of this application.

As shown in FIG. 1, this application provides power supply circuit 100. The power supply circuit 100 includes power circuit 11, inductor 12, and a circuit constituting a loop of the power circuit 11 and the inductor 12. The loop may further include a capacitor and other components. The power circuit 11 is configured to provide an alternating voltage, and the inductor 12 and the capacitor receive the alternating voltage and convert it to a direct current voltage and output to a subsequent circuit.

Figure 2A:
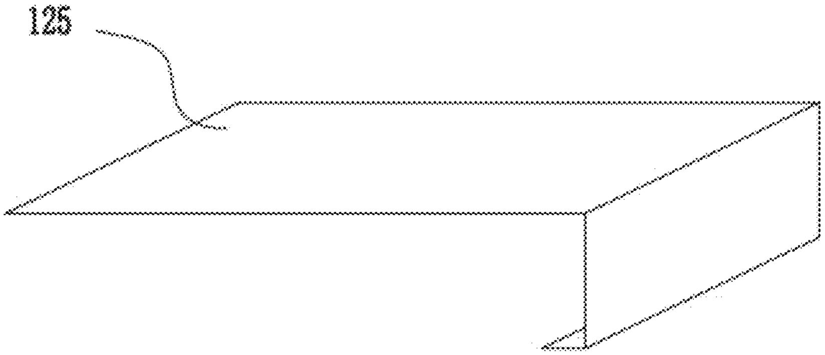
FIGS. 2A-2C are schematic composition diagrams of an inductor.
Figure 2B:
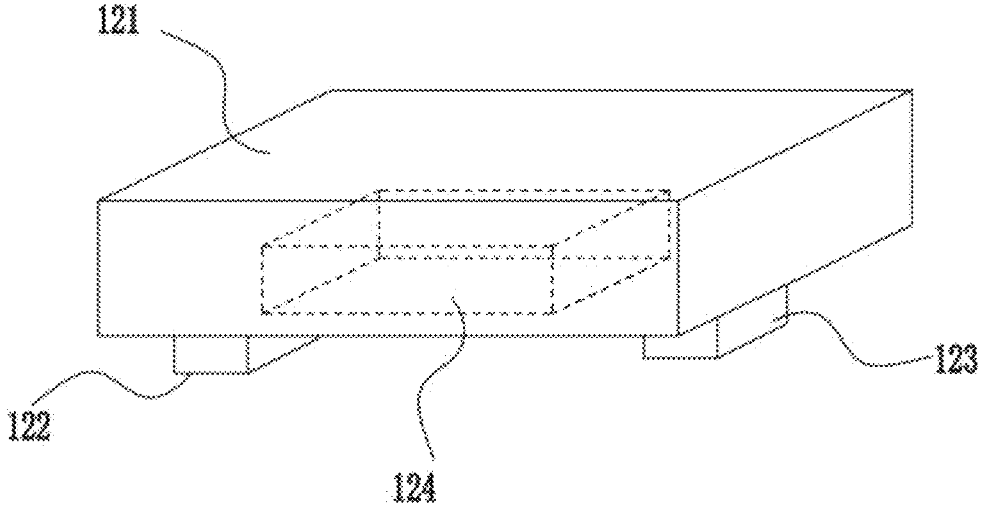
Figure 2C:
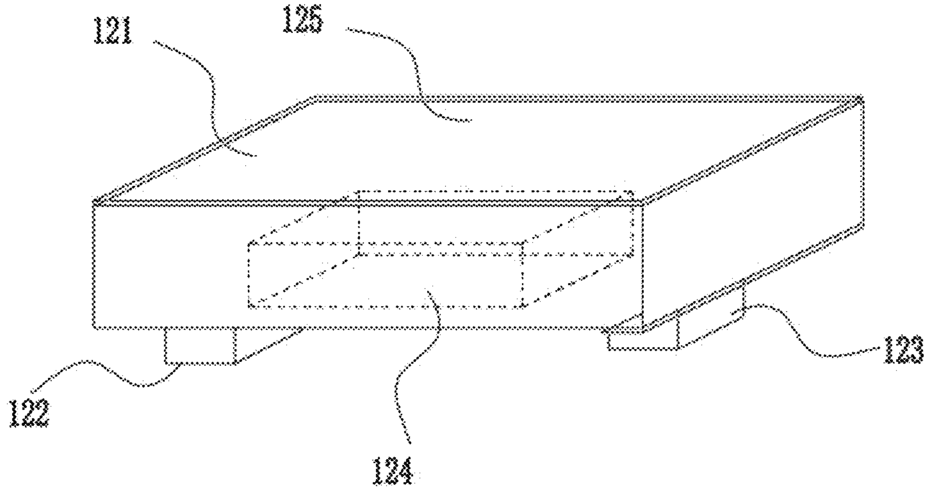

As shown in FIGS. 2A-2C, the inductor 12 includes encapsulation shell 121, input electrode 122, output electrode 123, and metal shield layer 125. Inductive component 124 is encapsulated inside the encapsulation shell 121, and the input electrode 122 is exposed on the surface of the encapsulation shell 121 and configured to receive the alternating voltage output by the power circuit 11. The output electrode 123 is configured to output a direct current voltage, the output electrode 123 and the input electrode 122 are exposed on the surface of the encapsulation shell 121, and the encapsulation shell 121 electrically isolates the input electrode 122 from the output electrode 123. The metal shield layer 125 asymmetrically covers the surface of the encapsulation shell 121, the metal shield layer 125 is in electrical contact with the output electrode 123, and the metal shield layer 125 keeps the input electrode 122 electrically isolated from the output electrode 123. The metal shield layer 125 is provided to ensure a good electromagnetic shielding effect of the inductor 12 and can reduce the size of the inductor 12, thereby facilitating the miniaturization of the inductor 12 and reducing the difficulty of arranging the inductor 12 in the circuit.

It should be noted that if the coverage of the metal shield layer 125 is too large and a current is transmitted between the input electrode 122 and the output electrode 123 through the metal shield layer 125, there is no electrical isolation between the input electrode 122 and the output electrode 123. In this case, the inductor 12 is easily short-circuited, or there is a risk of current breakdown for the inductor 12. To prevent the inductor 12 from being short-circuited by the metal shield layer 125, the metal shield layer 125 keeps the input electrode 122 electrically isolated from the output electrode 123, that is, spacing needs to be maintained between the metal shield layer 125 covering the input electrode 122 and the metal shield layer 125 covering the output electrode 123. The spacing keeps the input electrode 122 electrically isolated from the output electrode 123, thus allowing the inductor 12 to operate normally.

In an implementation, the input electrode is exposed on one side of the encapsulation shell, the output electrode is exposed on another side of the encapsulation shell opposite to the input electrode, and the metal shield layer covers at least a part of two bottom surfaces of the encapsulation shell adjacent to the side on which the output electrode is located. In this implementation, the metal shield layer covers the side on which the output electrode is located and the bottom surface adjacent to the side on which the output electrode is located and can be electrically connected to the output electrode. Such a setting is conducive to expanding the coverage of the metal shield layer 125, such that the metal shield layer 125 can have a better electric field shielding effect.

In an implementation, the metal shield layer 125 covers at least one surface of the encapsulation shell 121, and such an arrangement enables the metal shield layer 125 to isolate, from at least one direction, the radiation of the external electric field to the inductor 12 or the radiation of the internal electric field of the inductor 12 to the outside. The arrangement is also conducive to expanding the coverage of the metal shield layer 125, such that the metal shield layer 125 can have a better electric field shielding effect. In this implementation, the input electrode 122 is exposed on the bottom surface of the encapsulation shell 121, the output electrode 123 is exposed on the same bottom surface of the encapsulation shell 121 as the input electrode 122, and the metal shield layer 125 covers at least part or all of the top surface of the encapsulation shell 121 opposite to the bottom surface.

In an implementation, the encapsulation shell 121 is a flat cuboid, and the encapsulation shell 121 may be made of magnetic material or other materials, which is not limited in this embodiment. The flat cuboid covers the input electrode 122, the inductive component 124, and the output electrode 123; the input electrode 122 is disposed on a side of the encapsulation shell 121; the output electrode 123 is disposed on a side of the encapsulation shell 121 away from the input electrode 122; the inductive component 124 is disposed between the input electrode 122 and the output electrode 123. The bottom surface of the encapsulation shell 121 and the opposite top surface each have an area larger than the other sides of the flat cuboid. In an implementation, the metal shield layer 125 covers the top surface of the flat cuboid, and the metal shield layer 125 extends from the top surface to the bottom surface along the side near the output electrode 123 until it contacts the output electrode 123 exposed on the bottom surface, such that the potential of the metal shield layer 125 is the same as that of the output electrode 123. The metal shield layer 125 extends from the top surface to the side adjacent to, but not in contact, with the output electrode 123. In this way, the metal shield layer 125 covers areas including the top surface of the flat cuboid, a part of the bottom surface on which the output electrode 123 is located, and the side adjacent to, but not in contact with, the output electrode 123. The three areas make the metal shield layer 125 connected as a whole, such that the coverage of the metal shield layer 125 can increase as much as possible, and the inductor 12 can have a better electric field shielding effect and reduce the radiation of the inductor 12 to the external environment. In the prior art, the copper foil usually covers the side near the input electrode 122 and the side near the output electrode 123, while the inductive component 124 between the input electrode 122 and the output electrode 123 is not covered. Consequently, the magnetic force entering the inductor 12 from outside easily affects the inductive component 124, and the inductive component 124 generates the near field, thus changing the internal potential difference of the inductor 12, resulting in an unbalanced electron transfer in the inductor 12. In contrast, the metal shield layer 125 in this application covers a larger area on the surface of the encapsulation shell 121. The metal shield layer 125 can isolate the electric field from the outside and also prevent the near field generated inside the inductor 12 from radiating to the outside. The alternating voltage received by the input electrode 122 in this application passes the inductive component 124 and then is output by the output electrode 123. In this case, the voltage output by the output electrode 123 is a stable direct current voltage, that is, there is no induced electromotive force generated at the output electrode 123. The metal shield layer 125 near the output electrode 123 is in contact with the output electrode 123 exposed on the bottom surface of the encapsulation shell 121, such that the metal shield layer 125 has the potential same as that of the output electrode 123. Because the input electrode 122 receives the alternating voltage from the power circuit 11, an alternating electric field is generated on the inductor 12, which is shielded by a stable potential or zero potential. The metal shield layer 125 is electrically connected to the output electrode 123, such that the metal shield layer 125 has a relatively stable potential, and thus can shield the outward radiation of the alternating electric field. In this way, the energy of the alternating electric field can be suppressed and the impact of the inductor 12 on the external environment is greatly reduced.

Figure 3A:
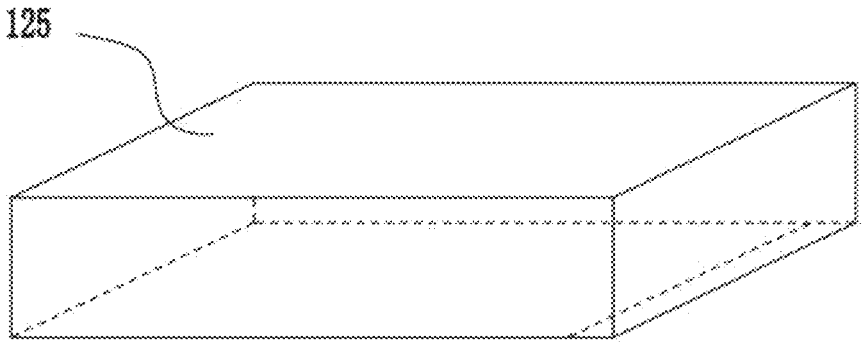
FIGS. 3A-3C are schematic diagrams of a metal shield layer and an encapsulation shell.
Figure 3B:
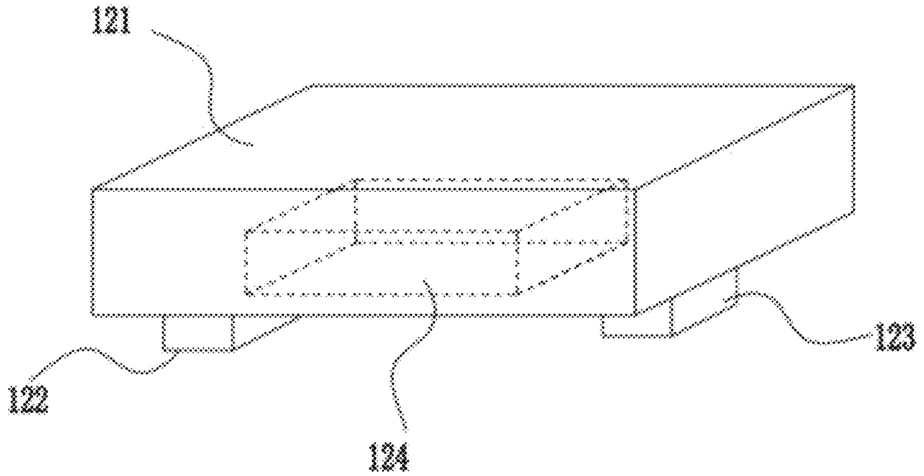
Figure 3C:
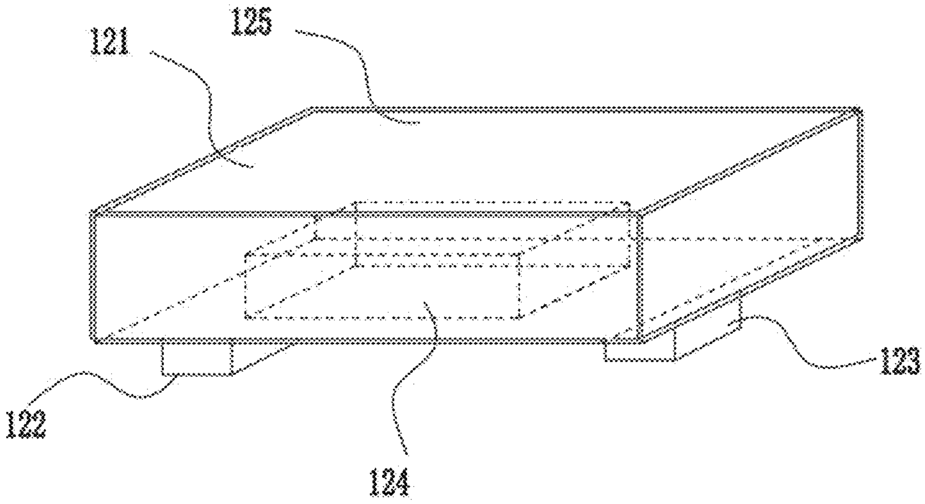

As shown in FIGS. 3A-3C, in another implementation, the metal shield layer 125 extends from the top surface of the flat cuboid to the bottom surface along multiple sides of the flat cuboid. On a side adjacent to the input electrode 122, the metal shield layer 125 avoids the input electrode 122, and on a side adjacent to the output electrode 123, the metal shield layer 125 contacts the output electrode 123, such that the potential of the metal shield layer 125 is the same as that of the output electrode 123. In this way, the metal shield layer 125 covers areas including the top surface of the flat cuboid, a part of the bottom surface on which the output electrode 123 is located, a side adjacent to, but not in contact with, the output electrode 123, and all or part of two sides in contact with the output electrode 123. Spacing is kept between the input electrode 122 and the metal shield layer 125 covering the two sides in contact with the output electrode 123, such that the output electrode 123 is electrically isolated from the input electrode 122. During the operation of the inductor 12, when the current input via the input electrode 122 passes the inductive component 124, the inductive component 124 generates a changing magnetic field. When the magnetic field moves toward the top surface of the flat cuboid, the magnetic field meets the metal shield layer 125, and eddy currents are generated, which counteract the changes in the magnetic field. The top surface of the flat cuboid can counteract most of the magnetic field generated by the inductive component 124 because the metal shield layer 125 covers the top surface. This greatly reduces the magnetic field radiated to the outside by the inductive component 124, thus reducing the magnetic field interference from the inductor 12 to the outside.

The input electrode 122 is provided on the bottom surface of the flat cuboid, the input electrode 122 is at least partially exposed on the bottom surface of the flat cuboid, and the input electrode 122 is located on a side of the inductive component 124. The input electrode 122 is made of conductive material. In an implementation, the input electrode 122 may be a copper foil solder pin made of copper foil, and the copper foil solder pin may be a plug-in pin soldered to the flat cuboid or a surface-mounted device (SMD) soldered to the flat cuboid, which is not specifically limited in this embodiment.

The output electrode 123 is also provided on the bottom surface of the flat cuboid, the output electrode 123 is at least partially exposed on the bottom surface of the flat cuboid, and the output electrode 123 is located on a side of the inductive component 124 away from the input electrode 122. The output electrode 123 is made of conductive material. In an implementation, the input electrode 122 may be a copper foil solder pin made of copper foil, and the copper foil solder pin may be a plug-in pin soldered to the flat cuboid or an SMD soldered to the flat cuboid, which is not specifically limited in this embodiment.

The inductive component 124 is located between the input electrode 122 and the output electrode 123, and a terminal of the inductive component 124 is connected to the input electrode 122, and the other terminal of the inductive component 124 is connected to the output electrode 123.

Figure 4:
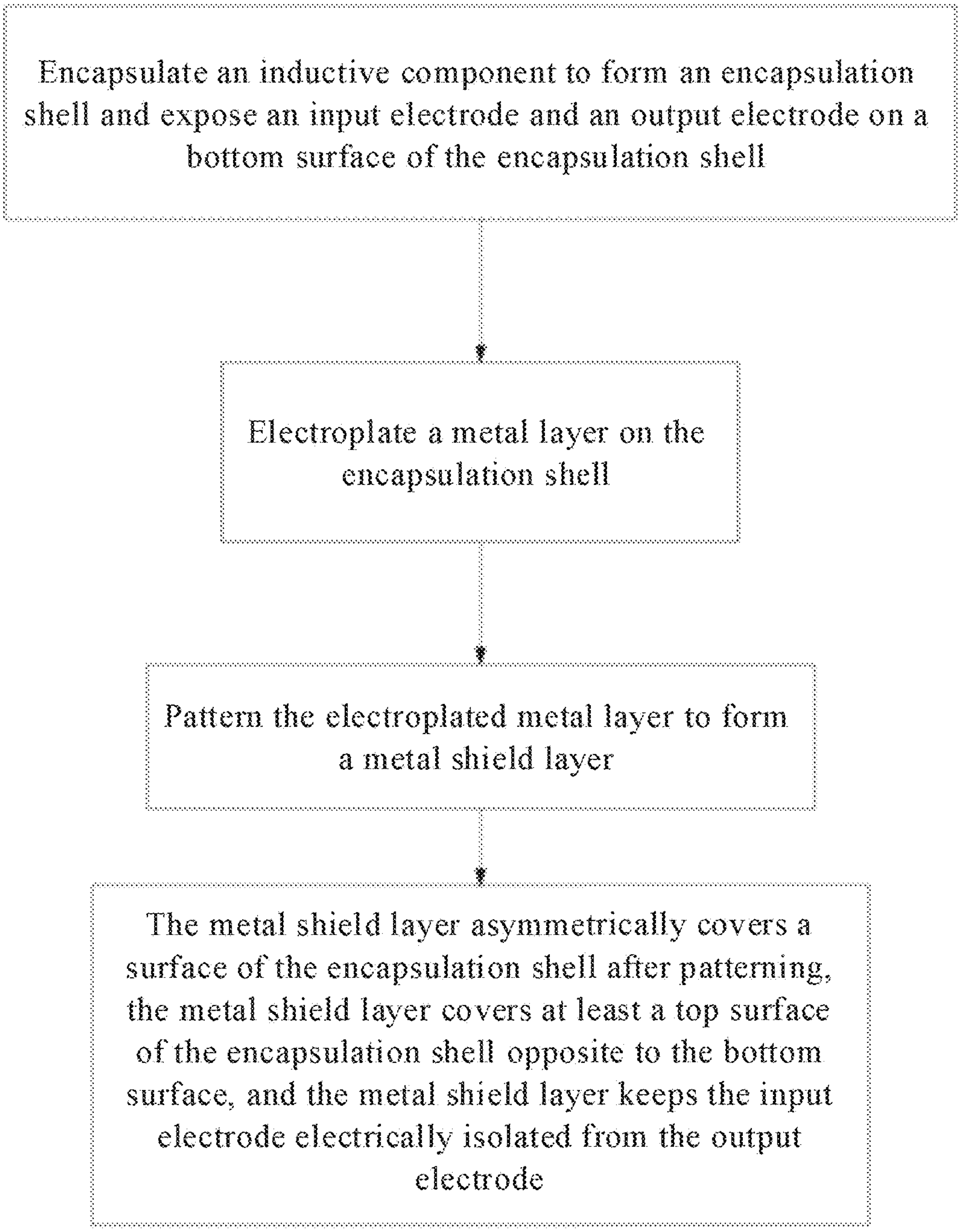
FIG. 4 is a flowchart of an inductor fabrication method.

As shown in FIG. 4, this application further proposes a fabrication method for the inductor 12 described above, including the following steps:

encapsulating inductive component 124 to form encapsulation shell 121 and exposing input electrode 122 and output electrode 123 on the bottom surface of the encapsulation shell 121;

electroplating a metal layer on the encapsulation shell 121; and patterning the electroplated metal layer to form the metal shield layer 125.

The metal shield layer 125 asymmetrically covers the surface of the encapsulation shell 121 after patterning and covers at least a top surface of the encapsulation shell 121 opposite to the bottom surface, and the metal shield layer 125 keeps the input electrode 122 electrically isolated from the output electrode 123.

The metal shield layer 125 is in electrical contact with the output electrode 123, such that the potential of the metal shield layer 125 is the same as that of the output electrode 123. The metal shield layer 125 may be in a mesh structure or other graphic structures.

The inductor 12 provided in this application is made through the method described above. According to the fabrication method, a metal layer is deposited on the surface of the encapsulation shell 121 through electroplating, and then the metal layer is patterned to form the metal shield layer 125 covering the top surface of the encapsulation shell 121. The coverage of the metal shield layer 125 is increased as much as possible, and the input electrode 122 is electrically isolated from the output electrode 123. The traditional method usually winds the copper foil through manual operation, which causes low production efficiency and is not conducive to production automation Compared with the prior art, the fabrication method proposed in this application can improve production efficiency. In addition, the inductor 12 fabricated in this method has a better anti-interference ability, maximizes the shielding effect, maintains a stable potential, and reduces the risk of open or short circuits.

In the claims, "comprise" does not exclude other units or steps, and "a" or "an" does not exclude plural cases. In the claims, ordinal words such as "first" and "second" describing claim elements do not mean that a claim element has priority, order, or chronological order over another claim element, of performance of the action, but merely to distinguish one claim element from another. Although some specific technical features are documented separately in distinct dependent claims, this does not mean that these specific technical features cannot be utilized in combination. Aspects of the present disclosure may be used individually, in combination, or in various arrangements not specifically described in the embodiments above, so as not to limit their application to the details and arrangement of the components described before or shown in the accompanying drawings. For example, multiple aspects described in one embodiment may be used in any manner in combination with multiple aspects described in other embodiments. The steps, functions, or features documented in a plurality of modules or units may be performed or satisfied by a single module or a single unit. The steps of the method disclosed herein are not limited to being performed in any particular order, and it is possible to perform some or all of the steps in other orders. Any reference numeral in the claims should not be considered as limiting on the involved claims.

Although preferred embodiments of this application have been disclosed for exemplary purposes, those of ordinary skill in the art should realize that various improvements, additions, and substitutions are possible without departing from the scope and spirit of this application as disclosed by the appended claims.

What is claimed is:

1. An inductor, comprising:

an encapsulation shell with an inductive component encapsulated inside;

an input electrode, wherein the input electrode is exposed on a surface of the encapsulation shell and is connected to an alternating voltage power circuit, and the input electrode receives an alternating voltage output by the alternating voltage power circuit;

an output electrode, wherein the output electrode is exposed on the surface of the encapsulation shell and is configured to output a direct current voltage, wherein the input electrode and the output electrode are electrically isolated by the encapsulation shell; and a metal shield layer, wherein the metal shield layer asymmetrically covers an entire top surface of the encapsulation shell, an entire side surface of the encapsulation shell, and an entire bottom edge of the encapsulation shell, wherein a width of the metal shield layer is the same as a width of the encapsulation shell, wherein the metal shield layer is electrically connected to the output electrode, and wherein the metal shield layer keeps the input electrode electrically isolated from the output electrode.

2. The inductor according to claim 1, wherein the input electrode and the output electrode are exposed on two sides of a bottom surface of the encapsulation shell; and the metal shield layer covers at least a part of the bottom surface of the encapsulation shell.

3. The inductor according to claim 1, wherein the input electrode is exposed on a bottom surface of the encapsulation shell, the output electrode is exposed on the same bottom surface of the encapsulation shell as the input electrode, and the metal shield layer covers at least a part or all of a top surface of the encapsulation shell, wherein the top surface is opposite to the bottom surface.

4. The inductor according to claim 3, wherein the encapsulation shell is a flat cuboid, and areas of the bottom surface and the top surface are larger than other sides of the flat cuboid.

5. The inductor according to claim 4, wherein the metal shield layer extends from the top surface of the flat cuboid to the bottom surface along a side adjacent to the output electrode until the metal shield layer contacts the output electrode.

6. The inductor according to claim 5, wherein the metal shield layer covers three areas comprising the top surface of the flat cuboid, a part of the bottom surface where the output electrode is located, and the side adjacent to the output electrode, and the three areas make the metal shield layer connected as a whole.

7. The inductor according to claim 4, wherein the metal shield layer extends from the top surface of the flat cuboid to the bottom surface along a plurality of sides, the metal shield layer avoids the input electrode, and the metal shield layer contacts the output electrode.

8. The inductor according to claim 7, wherein the metal shield layer covers areas comprising the top surface of the flat cuboid, a part of the bottom surface where the output electrode is located, and four side surfaces, wherein the metal shield layer avoids the input electrode, such that the output electrode and the input electrode are electrically isolated.

9. A fabrication method of the inductor according to claim 1, comprising:

encapsulating the inductive component to form the encapsulation shell and exposing the input electrode and the output electrode on a bottom surface of the encapsulation shell;

electroplating a metal layer on the encapsulation shell; and patterning the metal layer to form the metal shield layer, wherein the metal shield layer asymmetrically covers a surface of the encapsulation shell after patterning, the metal shield layer covers at least a top surface of the encapsulation shell, wherein the top surface is opposite to the bottom surface, and the metal shield layer keeps the input electrode electrically isolated from the output electrode.

10. The fabrication method according to claim 9, wherein the metal shield layer is in electrical contact with the output electrode, wherein a potential of the metal shield layer is the same as a potential of the output electrode.

11. A power supply circuit, comprising:

a power circuit configured to provide the alternating voltage;

the inductor according to claim 1, wherein the input electrode of the inductor receives the alternating voltage output by the power circuit; and a circuit connecting the power circuit and the inductor.

12. The fabrication method according to claim 9, wherein in the inductor, the input electrode and the output electrode are exposed on two sides of a bottom surface of the encapsulation shell; and the metal shield layer covers at least a part of the bottom surface of the encapsulation shell.

13. The fabrication method according to claim 9, wherein in the inductor, the input electrode is exposed on the bottom surface of the encapsulation shell, the output electrode is exposed on the same bottom surface of the encapsulation shell as the input electrode, and the metal shield layer covers at least a part or all of the top surface of the encapsulation shell, wherein the top surface is opposite to the bottom surface.

14. The fabrication method according to claim 13, wherein in the inductor, the encapsulation shell is a flat cuboid, and areas of the bottom surface and the top surface are larger than other sides of the flat cuboid.

15. The fabrication method according to claim 14, wherein in the inductor, the metal shield layer extends from the top surface of the flat cuboid to the bottom surface along a side adjacent to the output electrode until the metal shield layer contacts the output electrode.

16. The fabrication method according to claim 15, wherein in the inductor, the metal shield layer covers three areas comprising the top surface of the flat cuboid, a part of the bottom surface where the output electrode is located, and the side adjacent to the output electrode, and the three areas make the metal shield layer connected as a whole.

17. The fabrication method according to claim 14, wherein in the inductor, the metal shield layer extends from the top surface of the flat cuboid to the bottom surface along a plurality of sides, the metal shield layer avoids the input electrode, and the metal shield layer contacts the output electrode.

18. The fabrication method according to claim 17, wherein in the inductor, the metal shield layer covers areas comprising the top surface of the flat cuboid, a part of the bottom surface where the output electrode is located, and four side surfaces, wherein the metal shield layer avoids the input electrode, such that the output electrode and the input electrode are electrically isolated.

19. The power supply circuit according to claim 11, wherein in the inductor, the input electrode and the output electrode are exposed on two sides of a bottom surface of the encapsulation shell; and the metal shield layer covers at least a part of the bottom surface of the encapsulation shell.

20. The power supply circuit according to claim 11, wherein in the inductor, the input electrode is exposed on a bottom surface of the encapsulation shell, the output electrode is exposed on the same bottom surface of the encapsulation shell as the input electrode, and the metal shield layer covers at least a part or all of a top surface of the encapsulation shell, wherein the top surface is opposite to the bottom surface.

* * * * *